United States Patent [19]

Tsunefuji

[11] Patent Number: 5,594,517
[45] Date of Patent: Jan. 14, 1997

[54] ENLARGEMENT PHOTOGRAPHING APPARATUS

[75] Inventor: Katsuhiko Tsunefuji, Sagamihara, Japan

[73] Assignee: Olympus Optical Co., Ltd., Tokyo, Japan

[21] Appl. No.: 237,685

[22] Filed: May 4, 1994

[30] Foreign Application Priority Data

May 7, 1993 [JP] Japan .................................. 5-106763
May 7, 1993 [JP] Japan .................................. 5-106764

[51] Int. Cl.$^6$ ........................... G03B 13/32; G02B 7/105
[52] U.S. Cl. ......................... 396/87; 359/705; 359/823; 396/88; 396/542
[58] Field of Search ....................... 354/195.1, 195.12, 354/286, 289.1, 289.11, 289.12; 359/702, 704, 705, 822, 823, 824

[56] References Cited

U.S. PATENT DOCUMENTS

| | | | |
|---|---|---|---|
| 3,851,952 | 12/1974 | Werz et al. | 359/705 |
| 4,213,686 | 7/1980 | Kellner | 354/286 |
| 4,255,020 | 3/1981 | Yokio | 359/705 |
| 4,332,444 | 6/1982 | Nozawa et al. | 354/289.1 |
| 4,870,436 | 9/1989 | Tanaka | 354/195.1 |
| 5,077,569 | 12/1991 | Notagashira et al. | 354/195.12 |

FOREIGN PATENT DOCUMENTS

| | | |
|---|---|---|
| 2-48612 | 2/1990 | Japan . |
| 2-48613 | 2/1990 | Japan . |
| 3-223817 | 10/1991 | Japan . |
| 3-223804 | 10/1991 | Japan . |

*Primary Examiner*—A. A. Mathews
*Attorney, Agent, or Firm*—Louis Weinstein

[57] ABSTRACT

An enlargement photographing apparatus of this invention, arranged between photographing lenses and a camera body, comprises a distance changing unit extending and retracting in an optical-axis direction for changing a distance between the photographing lenses and the camera body, a feeding-quantity detecting unit for detecting a quantity of feeding with respect to a reference position of the distance changing unit, a computing unit for computing a photographing scale factor on the basis of output information of the feeding-quantity detecting unit. information regarding the photographing lenses and the camera body and information of a reference length of the distance changing unit which is arranged on the enlargement photographing apparatus, and a display unit for displaying the photographing scale factor on the basis of an output from the computing unit.

28 Claims, 11 Drawing Sheets

FIG.5

| LENS | f: 38 mm | | F: 1.5 |
|---|---|---|---|
| MAGNIFICATION | 3.5 | FEED QUANTITY | 15 mm |
| BELLOWS OVERALL LENGTH | 119 mm | LENS FORWARD END DISTANCE | 36 mm |
| SUBJECT DISTANCE | 216 mm | EXPOSURE MAGNIFICATION | 20.3 |
| SUBJECT RANGE | 69 × 103 mm | | |

ENLARGEMENT PHOTOGRAPHING APPARATUS

BACKGROUND OF THE INVENTION

1. Field of the Invention

This invention relates to enlargement photographing apparatuses and, more particularly, to an enlargement photographing apparatus for changing a relative distance between photographing lenses and a camera body.

2. Related Art And Prior Art Statement

Conventionally, close-up photographing and enlargement photographing by the use of a camera of a single-lens reflex system are performed by insertion of a light-shielded or shaded intermediate device between a camera body and photographing lenses, as disclosed in, for example, Japanese Patent Laid-Open No. HEI 2-48612 or Japanese Patent Laid-Open No. HEI 2-48613. As the intermediate device, a bellows type device is used for connecting a mounting portion on the side of the camera and a mounting portion on the side of the photographing lenses by means of a bellows in an extendible and retractable manner, an intermediate ring with which a ring set to a constant or predetermined length is combined, or the like.

The above-described close-up photographing is performed between about 0.2 times to about 12 times of a photographing magnification or scale factor, and is realized by the fact that a length of the intermediate ring or the like for lenses of a focal distance in accordance with each of the photographing scale factors is changed. Further, display of these photographing scale factors is mechanically performed on the photographing lenses.

FIG. 11A, FIG. 11B and FIG. 11C of the attached drawings are correlation model figures between a feeding quantity $d$ of conventional photographing lenses and a photographing scale factor $\beta$.

In these figures, the reference character $L$ denotes a photographing lens having a focal distance or length $f$; $F$, a film surface serving as an image-formation or imaging surface; $H_0$, a subject; $H$, an imaged image; $a$, a subject distance (a distance between the photographing lenses $L$ and the subject $H_0$); $b$, an image distance (a distance between the photographing lenses $L$ and the imaging surface $F$); and $l$, a photographing distance (a distance between the subject $H_0$ and the imaging surface $F$).

FIG. 11A shows the time at which the quantity of feeding $d$ of the photographing lenses $L$ is zero, and illustrates a case where a focal point of the lens $L$ is located at the imaging surface $F$ so that the photographing scale factor $\beta=1/\infty$.

FIG. 11B and FIG. 11C show a state under which the lens $L$ is fed. FIG. 11B shows the time at which the photographing scale factor $\beta$ is substantially one time, while FIG. 11C shows the time at which the photographing scale factor $\beta$ is two times.

Moreover, the photographing scale factor $\beta$, the photographing distance $l$ and the subject distance $a$ can be expressed by the following relationship:

$$\beta = H/H_0 = b/a = d/f \qquad (1)$$

$$l = f + (1+\beta)^2/\beta \qquad (2)$$

$$a = f(1+1/\beta) \qquad (3)$$

From the above equation (1), since the photographing scale factor $\beta$ is in proportion to the quantity of feeding of the lens $d$, the quantity of feeding of the lens $d$ is adjusted to obtain a desired photographing scale factor $\beta$. As a matter of fact, the aforesaid length of the intermediate device between the camera and the photographing lenses is adjusted. However, it becomes troublesome to find $d$ from the above equation (1) every time thereof. Accordingly, generally, $d$ is found from a table in which the relationship between the photographing scale factor and the quantity of feeding which are attached to the close-up lens is previously calculated or computed as shown in Table 1 so that the length is adjusted while reading a scale or graduation or the like which is provided on the intermediate device.

TABLE 1

| image scale factor | length of bellows (lens feeding quantity) | graduation of scale | subject distance from film surface | subject distance from the forward end of lens barrel | range of subject fully coming out on film surface (short side × long side) | exposure scale factor |
|---|---|---|---|---|---|---|
| 1.81 | 3.6 cm | 68 mm | 16.2 cm | 4.6 cm | 13.2 × 19.8 mm | 7.9 × |
| 2.0 | 4.2 | 75 | 16.7 | 4.4 | 12.0 × 18.0 | 9.0 × |
| 2.2 | 5.0 | 83 | 17.3 | 4.3 | 10.9 × 16.4 | 10.2 × |
| 2.4 | 5.8 | 90 | 17.9 | 4.1 | 10.0 × 15.0 | 11.6 × |
| 2.6 | 6.5 | 98 | 18.5 | 4.0 | 9.2 × 13.8 | 13.0 × |
| 2.8 | 7.3 | 106 | 19.2 | 3.9 | 8.6 × 12.9 | 14.4 × |
| 3.0 | 8.0 | 113 | 19.9 | 3.8 | 8.0 × 12.0 | 16.0 × |
| 3.5 | 9.9 | 132 | 21.6 | 3.6 | 6.9 × 10.3 | 20.3 × |
| 4.0 | 11.8 | 151 | 23.3 | 3.5 | 6.0 × 9.0 | 25.0 × |

Macro-lens 38 mm F3.5

Meanwhile, as an enlargement photographing apparatus capable of changing a photographing scale factor by means of a motor, disclosed in Japanese Patent Laid-Open No. HEI 3-223804 or Japanese Patent Laid-Open No. HEI 3-223817 is technical means in which the motor is built into macro-photographing lenses, the motor is angularly moved by a scale-factor changing operation to change a distance between a camera body and photographing lenses, and scale-factor changing information is transmitted from a ROM built into the photographing lenses at the side of a camera body.

For the technical means disclosed in Japanese Patent Laid-Open No. HEI 2-48612 or Japanese Patent Laid-Open No. HEI 2-48613, however, photographing scale factor display is mechanically performed in the photographing lenses. Accordingly, a mechanism for the intermediate ring and a mechanical connecting mechanism for the photographing lenses are complicated.

Furthermore, as will be seen from the above equation (1), since the photographing scale factor is related to the focal point distance of the lenses, the above-described table 1 must be prepared for every kind of lens. Further, data must be referred to as shown in the Table every time the photographing scale factor is changed to perform photographing. This is a very large inconvenience.

Meanwhile, the technical means disclosed in Japanese Patent Laid-Open No. HEI 3-223804 or Japanese Patent Laid-Open No. HEI 3-223817 is one which varies or changes the scale factor while seeing a photographing frame, but is not one which automatically sets the scale factor to an assigned photographing scale factor. Further, a distance from the forward end of the photographing lenses to the subject, a so-called work distance is important information upon considering an illumination of the subject or the like, but display thereof or the like cannot be performed. Moreover, the technical means cannot be used in other lenses.

OBJECTS AND SUMMARY OF THE INVENTION

It is a first object of the invention to provide an enlargement photographing apparatus which can easily obtain or produce an optional photographing scale factor.

It is a second object of the invention to provide an enlargement photographing apparatus which can display, on a display portion in real time, a focal length of the lenses in use, an open F-number of the lenses in use, a photographing scale factor, the quantity of feeding, the overall length of the photographing apparatus, a distance between a subject and a forward end of a lens frame, a distance from the subject to a film surface, an exposure scale factor and longitudinal and lateral dimensions within a subject range capable of photographing, and which can simplify the photographing operation.

It is a third object of the invention to provide an enlargement photographing apparatus which can display, on a display portion, a focal length of the lenses in use, an open F-number of the lenses in use, a photographing scale factor, the quantity of feeding, the overall length of the photographing apparatus, a distance between a subject and a forward end of a lens frame, a distance from the subject to a film surface, an exposure scale factor and longitudinal and lateral dimensions within a subject range capable of photographing, and which can perform automatic setting to a set state by a motor.

It is a fourth object of the invention to provide an enlargement photographing apparatus which can generate a warning at those circumstances which break away from a photographing range.

It is a fifth object of the invention to provide an enlargement photographing apparatus which is capable of adequately supporting photographing lenses or the like and which can dissolve difficulty of operation in an enlargement photographing.

Briefly, according to the invention, there is provided an enlargement photographing apparatus arranged between photographing lenses and a camera body, which comprises:

distance changing means extended and retracted in an optical-axis direction to change a distance between the photographing lenses and the camera body;

feeding-quantity detecting means for detecting the quantity of feeding with respect to a reference position of said distance changing means;

computing means for computing a photographing scale factor on the basis of output information of said feeding-quantity detecting means, information regarding the photographing lenses and the camera body and information of a reference length of the distance changing means which is arranged on said enlargement photographing apparatus; and display means for displaying said photographing scale factor on the basis of an output from said computing means.

These as well as other objects and advantages of the present invention will become further apparent from the following detailed explanation.

BRIEF DESCRIPTION OF THE DRAWINGS

FIG. 5 is a first display example of an LCD display in the enlargement photographing apparatus according to the first embodiment;

DETAILED DESCRIPTION OF THE PREFERRED EMBODIMENTS

Various embodiments of the invention will hereunder be described with reference to the accompanying drawings.

Figure 1:
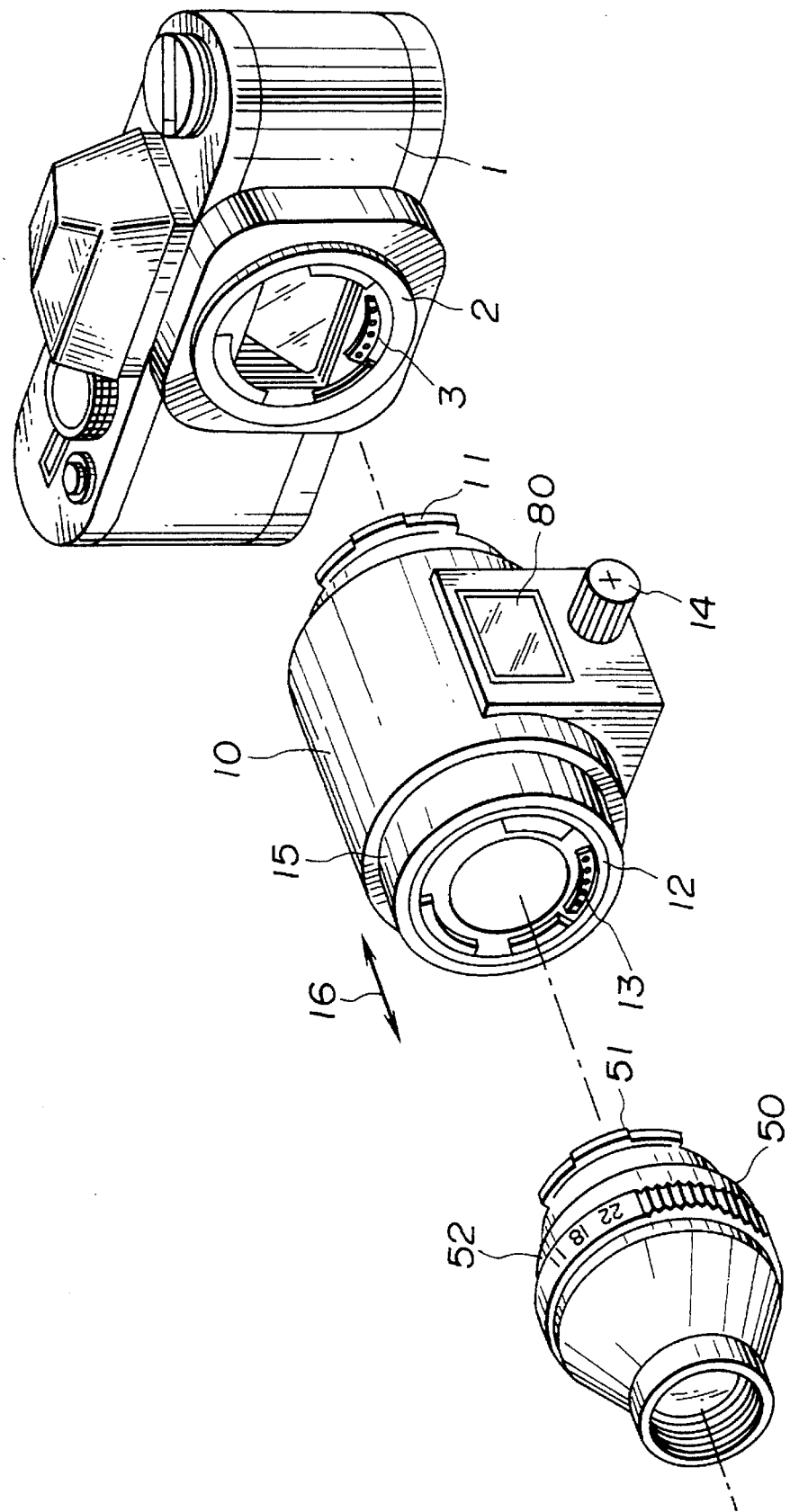
FIG. 1 is a perspective view of an outer appearance of a camera system, showing an enlargement photographing apparatus according to a first embodiment of the invention, and a camera body and a photographing lens-barrel of a single-lens reflex camera to which the enlargement photographing apparatus is applied.

FIG. 1 is a perspective view of an outer appearance, of a camera system showing an enlargement photographing apparatus according to a first embodiment of the invention, and a camera body and a photographing lens-barrel of a single-lens reflex camera to which the enlargement photographing apparatus is applied.

As shown in FIG. 1, a contact 3 on the camera body side, for fetching photographing-lens information into a camera body 1, is arranged on the inside of a body mount 2 for attachment of photographing lenses on the camera body 1. Further, a mount 11 which engages the body mount 2 is arranged on one end of the enlargement photographing apparatus 10, while a mount 12 which engages a photographing lens-barrel 50 is arranged on the other end of the enlargement photographing apparatus 10.

A contact 13 for fetching the photographing lens information is arranged on the inside of the mount 12, and is adapted to be engaged with a contact (not shown) which is arranged at a position on the photographing lens-barrel 50 which is opposed to the contact on the photographing lens-barrel.

Moreover, a lens-barrel 15 which is movable extendedly and in a retractable manner in an optical-axis direction indicated by an arrow 16 in FIG. 1 is arranged within the enlargement photographing apparatus 10, and is extendible and retractable in interlocking arrangement with angular movement of a feeding knob 14 which is arranged to project from on a lower portion at a center of the enlargement photographing apparatus 10.

A liquid-crystal (LCD) display 80 for displaying a photographing magnification or scale factor or the like which is computed to be described subsequently is arranged above the feeding knob 14 in an outer peripheral surface of the enlargement photographing apparatus 10. Furthermore, a mount 51 with which the mount 12 of the enlargement photographing apparatus 10 is engaged, and a diaphragm-value or stop-value setting ring 52 are arranged on the photographing lens-barrel 50.

Figure 2:
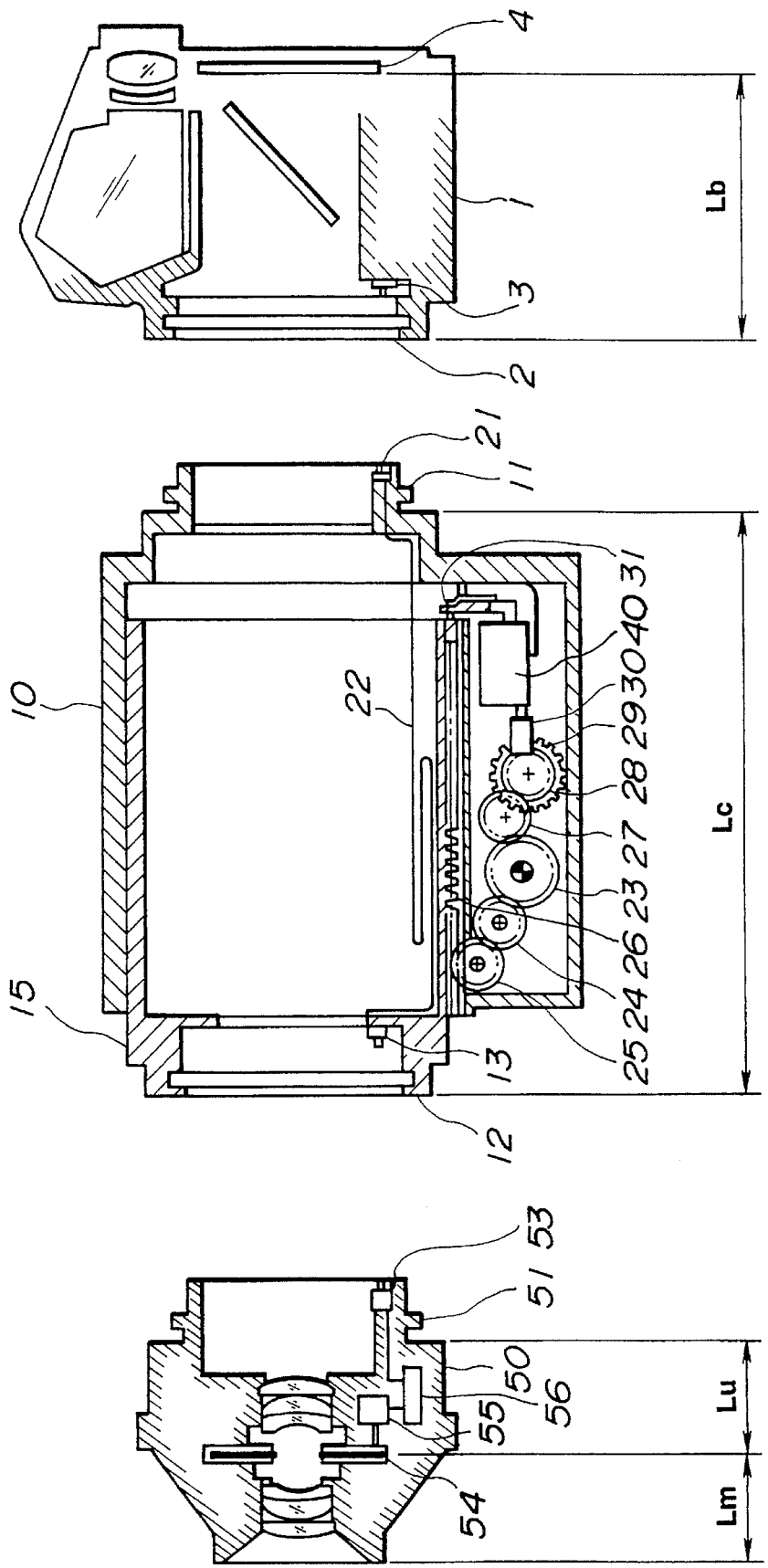
FIG. 2 is a central transverse cross-sectional schematic view showing the enlargement photographing apparatus according to the first embodiment, and the camera body and the photographing lens-barrel of the single-lens reflex camera to which the enlargement photographing apparatus is applied.

FIG. 2 is a schematic view of a central transverse cross section of the first enlargement photographing apparatus according to the embodiment, and the single-lens reflex camera body and the photographing lens-barrel to which the enlargement photographing apparatus is applied.

As shown in FIG. 2, the contact 3 on the side of the body is arranged on the body mount 2 in front of the camera body 1. Further, a film 4 is loaded in the rear of the interior of the camera body 1.

Furthermore, a contact 21 connected to the body contact 3 is arranged within the enlargement photographing apparatus 10. Moreover, the contact 21 is connected to the contact 13 through a flexible substrate 22. Further, a gear 23 angularly moved together with angular movement of the feeding knob 14 and a gear train 24 and 25 are arranged at the bottom of the enlargement photographing apparatus 10. The gear 25 is in mesh with a rack 26 which is arranged on the lens-barrel 15. Thus, the lens-barrel 15 is adapted to perform feeding and renormalizing operations.

Moreover, the gear 23 is adapted to angularly move a cut-out gear 29 by means of a gear train 27 and 28. A photocoupler 30 is mounted on the gear 29, and is adapted to convert the quantity of angular movement of the gear 29 to pulses to input the same to an operation or computing circuit (CPU) 40. That is, the quantity of feeding of the lens-barrel 15 is inputted to the CPU 40 in the form of a number of pulses.

The flexible substrate 22 is connected to the CPU 40, and information of the photographing lens-barrel 50 and information of the camera body 1 are adapted to be inputted thereinto. Furthermore, a switch 31 is a switch for resetting an initial position for the lens-barrel 15. As shown in FIG. 2, the switch 31 is adapted to be turned on under a state of the shortest reference length, to send a resetting signal to the CPU 40. Further, when the lens-barrel 15 is fed, the switch 31 is turned off so that the quantity of feeding is measured.

A contact 53 connected to the contact 13 of the enlargement photographing apparatus 10, a pulse motor 55 for driving a stop mechanism 54, and a control circuit 56 are arranged within the photographing lens-barrel 50. The control circuit 56 is adapted to control the pulse motor 55, and has built therein a memory which stores therein various kinds of data of the photographing lenses, and performs exchanging of information with respect to the enlargement photographing apparatus 10 and the camera body 1 through the contact 53.

Furthermore, in FIG. 2, it is assumed that a distance from the film surface of the camera body 1 to the body mount is $L_b$, the shortest length as the reference length of the enlargement photographing apparatus 10 is $L_c$, a distance from the lens mount to the lens principal point is $L_u$, and a distance from the lens principal point to the forward end of the lens frame is $L_m$.

Figure 3:
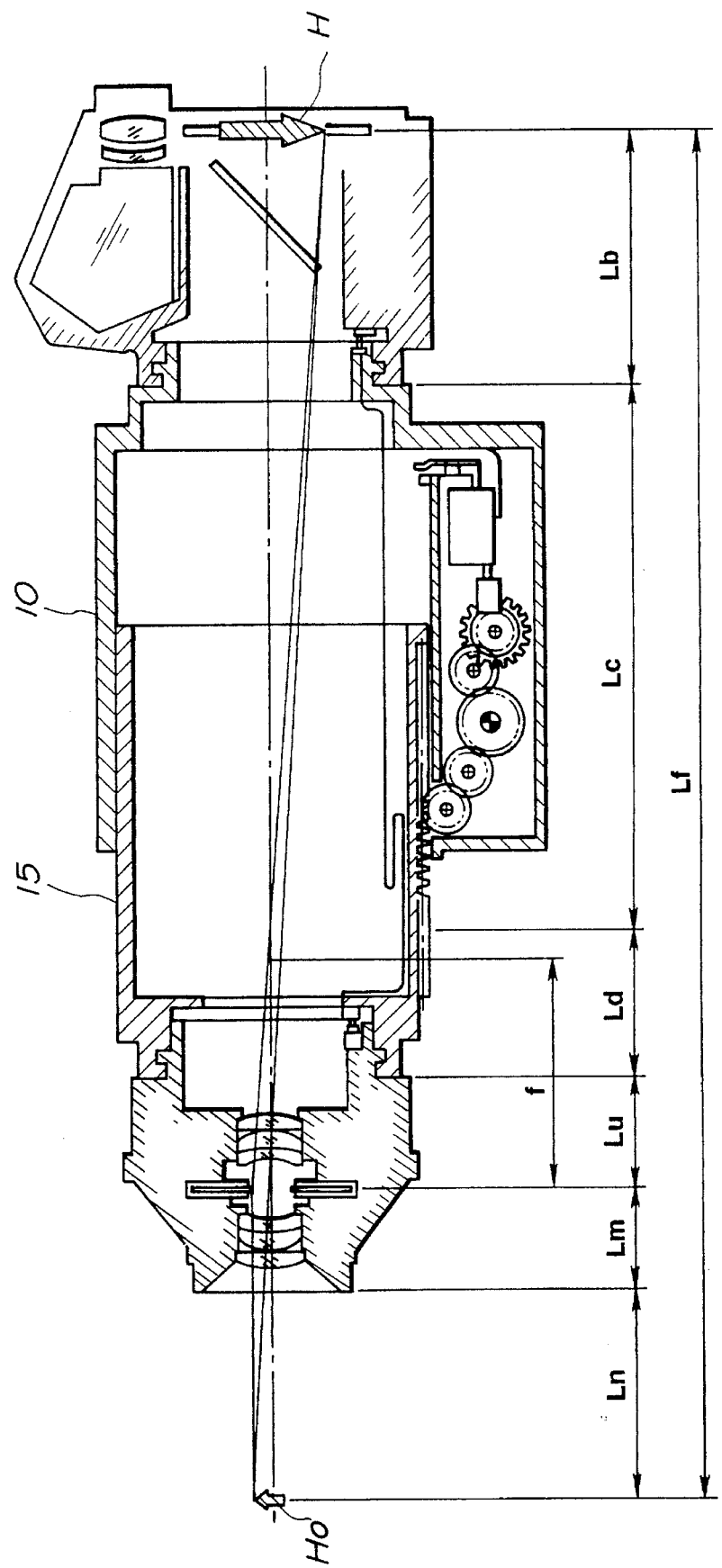
FIG. 3 is a cross-sectional schematic view under a photographing state at the time the enlargement photographing apparatus according to the first embodiment is coupled to the camera body and the photographing lens-barrel.

FIG. 3 is a cross-sectional schematic under the photographing state at the time the enlargement photographing apparatus according to the embodiment is coupled to the camera body and the photographing lens-barrel.

The lens-barrel 15 of the enlargement photographing apparatus 10 is fed out by a length $L_d$, and an enlarged image of a subject $H_0$ is formed on the film surface as $\underline{H}$. When it is assumed that a distance from the subject to the forward end of the lens frame is $L_n$, and a distance from the subject to the film surface is $L_f$, the following relationship holds from the equation (1), the equation (2) and the equation (3):

$$\beta = (L_b + L_c + L_d + L_u - f)/f \quad (4)$$

$$L_f = f(1+\beta)^2/\beta \quad (5)$$

$$L_n = f(1+1/\beta) - L_m \quad (6)$$

That is, a focal distance $\underline{f}$ of the photographing lenses, the distance $L_u$ from the lens mount to the lens principal point, a distance $L_m$ from the lens principal point to the forward end of the lens frame, the distance $L_b$ from the lens film surface of the camera body to the body mount, and the shortest distance $L_c$ of the enlargement photographing apparatus are known. If the quantity of feeding $L_d$ from the number of pulses from the photocoupler is measured, $\beta$, $L_f$ and $L_n$ can be calculated or computed.

Figure 4:
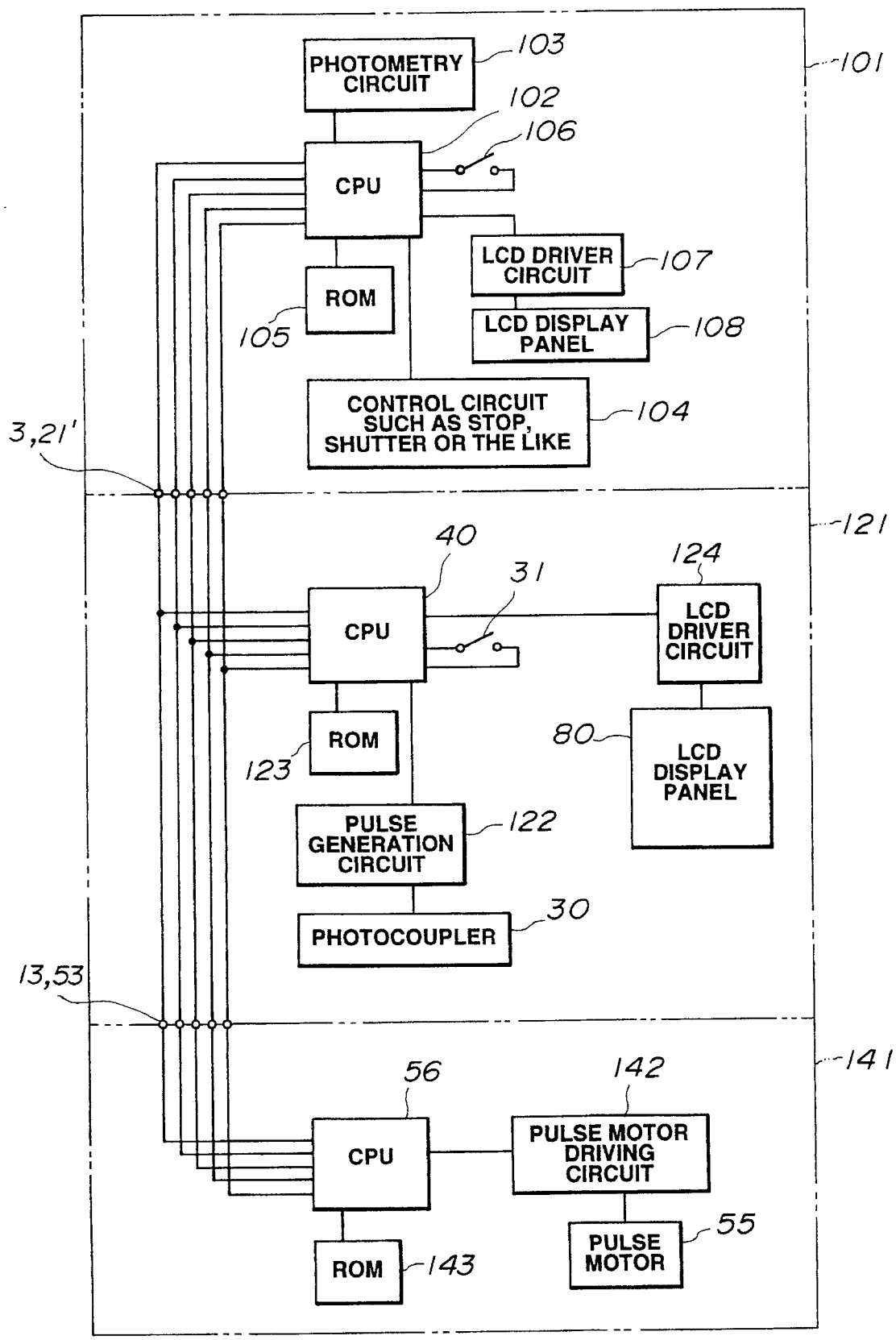
FIG. 4 is an electric circuit view showing an electric circuit in the enlargement photographing apparatus according to the first embodiment and the camera body and the photographing lens-barrel.

FIG. 4 is an electric circuit view showing an electric circuit in the enlargement photographing apparatus according to the embodiment, and the camera body and the photographing lens-barrel.

In FIG. 4, the reference numeral 101 denotes an electric circuit which is arranged within the camera body 1. A photometry circuit 103, a control circuit 104 such as a stop · shutter or the like, and a ROM 105 which stores therein various kinds of data such as the distance $L_b$ from the film surface of the camera body 1 to the body mount 2, and the like are connected to the CPU 102. When a release switch 106 is operated, the electric circuit is adapted to perform a series of photographing operations.

Moreover, an LCD display panel 108 is connected through an LCD driver circuit 107, and is adapted to display photographing information such as an exposure level, the photographing number and the like on a location withing a finder or on a location on the outside of the camera.

The reference numeral 121 denotes an electric circuit which is arranged within the enlargement photographing apparatus 10. A pulse generating circuit 122 for generating pulses from the photocoupler 30, a resetting switch 31 and a ROM 123 for storing therein various kinds of data are connected to the CPU 40. Data such as, specifically, the shortest lengths $L_c$ and the like of the enlargement photographing apparatus 10 are stored in the ROM 123. Furthermore, an LCD display 80 is connected to the CPU 40 through an LCD driver circuit 124 so that display of a photographing magnification computed by the CPU 40, or the like is capable of being provided.

The reference numeral 141 denotes an electric circuit which is arranged within the photographing lens-barrel 50. A pulse-motor driving circuit 142 and a R0M 143 in which various kinds of data are stored are connected to a control circuit (CPU) 56. Specifically, the focal length $\underline{f}$, the distance $L_u$ from the lens mount to the lens principal point, the distance $L_m$ from the lens principal point to the forward end of the lens frame, and the like are stored in the ROM 143.

These electric circuits 101, 121 and 141 are connected to each other through the contacts 3 and 21 and the contacts 13 and 53. Their respective CPU 102, CPU 40 and CPU 56 are capable of transmitting receiving the data. Information on the R0M 105, ROM 123 and ROM 143 are capable of freely being read.

FIG. 5 is a first display example of the LCD display 80 in the enlargement photographing apparatus according to the embodiment.

Display is provided by a plurality of 7-segment numerical characters. In FIG. 5, the reference numeral 201 denotes a focal length of the photographing lenses in use; 202, an open F-number of the photographing lenses in use; 203, a photographing scale factor B which is computed on the basis of the equation (4); 204, the quantity of feeding $L_d$ of the lens-barrel 15; 205, the overall length of the intermediate photographing device, which is a value of $L_c + L_d$; 206, a distance $L_n$ between the subject and the forward end of the photographing lens frame; and 207, the distance $L_f$ from the subject to the film surface. Furthermore, an exposure magnification 208, a longitudinal dimension 209 of a photographable range of the subject, a lateral dimension 210 and the like are capable of being displayed.

Operation of the embodiment arranged as described above will be described.

First, as shown in FIG. 3, the camera body 1, the enlargement photographing apparatus 10 and the photographing lens-barrel 50 are coupled to each other. Then, the enlargement magnification to be photographed is decided or determined, and the feeding knob 14 is rotated in a predetermined direction to respectively extend and retract the lens-barrel 15 to be front and in rear. At this time, if the magnification display 203 of the LCD display 80 is observed closely, the display changes accordance with movement of the lens-barrel 15. When the magnification becomes a desired magnification, operation of the feeding knob 14 should stop.

A display method of the LCD display 80 will next be described with reference to FIG. 4.

The lens-barrel 15 is extended and retracted by operation of the feeding knob 14, and the cut-out gear 29 is rotated so that the pulses corresponding to the quantity of extension and retraction are generated by the pulse generating unit 122. The pulses are inputted to the CPU 40 as a value of $L_d$.

Further, the CPU 40 performs communication with the control circuit 56 within the photographing lens-barrel 50 to read the focal length $\underline{f}$, the distance $L_u$ from the lens mount to the lens principal point, and the distance $L_m$ from the lens principal point to the forward end of the lens frame, which are stored in the ROM 143. Further, the CPU 40 reads the distance $L_b$ from the film surface of the camera body 1 to the body mount 2 in the camera body from the ROM 105 within the camera body 1, and reads the minimum or shortest length $L_c$ of the enlargement photographing apparatus 10 from the ROM 123.

In view of such information, $\beta$, $L_f$ and $L_n$ are computed on the basis of the equations (4), (5) and (6). Further, from these values, the overall length of the bellows, a photographable range of the subject or the like is computed. These values are displayed on the LCD display panel 80 through the LCD driver circuit as shown in FIG. 5.

As described above, the enlargement photographing apparatus according to the embodiment can extremely easily set the desired photographing scale factor, since the photographing information such as the photographing scale factor or the like is displayed in real time on the LCD display panel 80 in interlocking relationship with angular movement of the feeding knob 14. Moreover, at this time, various kinds of information at the time of the desired scale factor are simultaneously displayed on the LCD display portion 80 and, accordingly, it is very convenient.

In connection with the above, in the present embodiment, the distance $L_b$ from the film surface to the body mount 2 of the camera body 1 is held or retained in the ROM 105 within the camera, while the photographing lens information is retained in the ROM 143 within the lenses. However, this can be realized by such a method that all of this information stored in the ROM 123 within the enlargement photographing apparatus, and identification information of the photographing lenses and the camera body is fetched to the enlargement photographing apparatus.

According to such enlargement photographing apparatus, the focal length of the lenses being used, the open F-number of the lenses being used, the photographing scale factor, the quantity of feeding, the overall length of the photographing apparatus, the distance between the subject and the forward end of the lens frame, the distance from the subject to the film surface, the exposure scale factor and the longitudinal and lateral dimensions or sizes within the photographable subject range can be displayed on the display of the enlargement photographing apparatus in real time. Thus, the photographing operation can be simplified.

A second embodiment of the invention will next be described.

Figure 6:
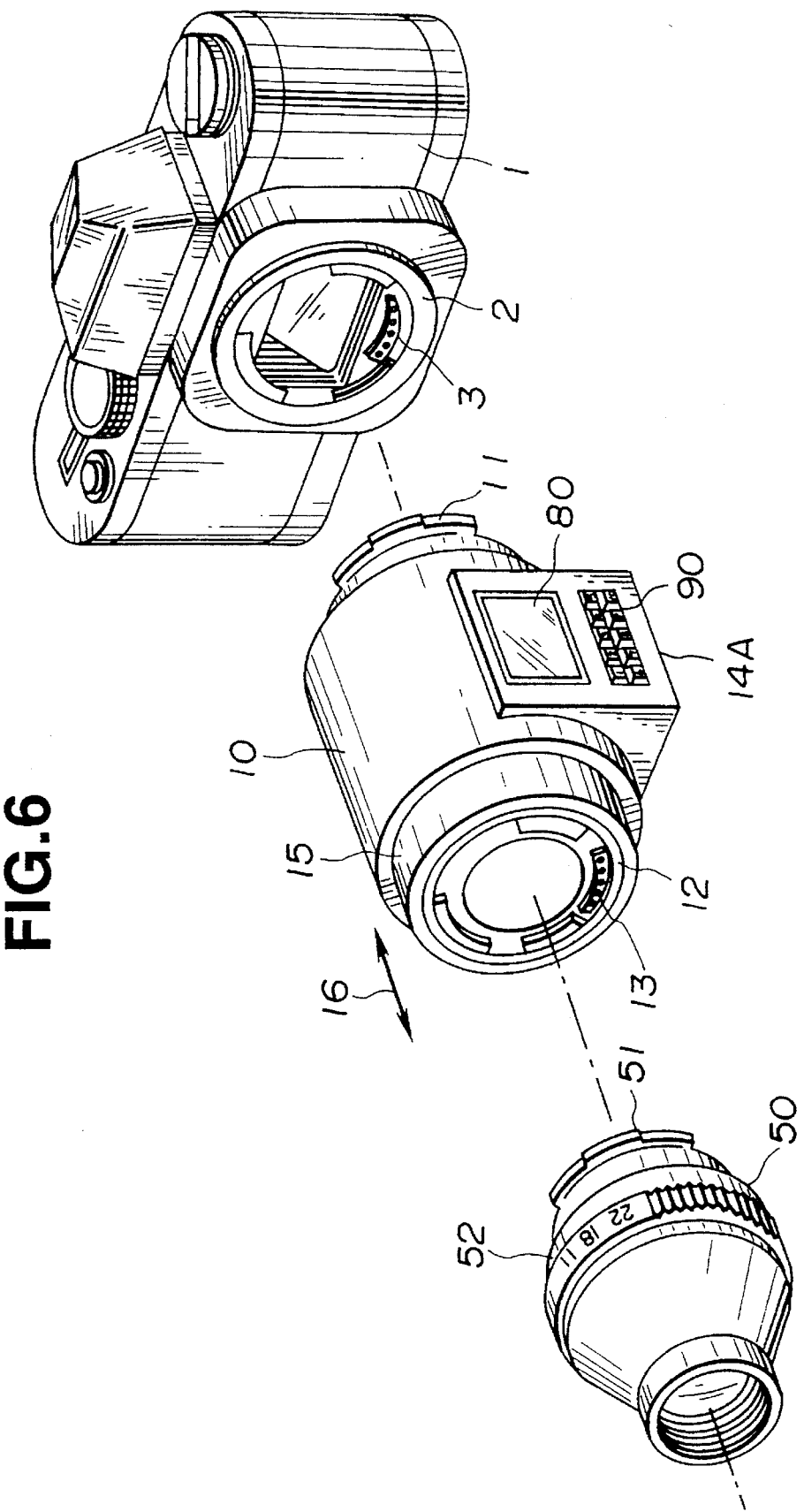
FIG. 6 is a perspective view of an outer appearance, showing an enlargement photographing apparatus according to a second embodiment of the invention, and a camera body and a photographing lens-barrel of a single-lens reflex camera to which the enlargement photographing apparatus is applied.

FIG. 6 is a perspective view of an outer appearance of a camera system, showing an enlargement photographing apparatus according to the second embodiment of the invention, and a camera body and a photographing lens-barrel of a single-lens reflex camera to which the enlargement photographing apparatus is applied.

The second embodiment is arranged as being substantially identical with the first embodiment, and is arranged such that a contact 3 on the side of a body for fetching photographing lens information to a camera body 1 is arranged within a body mount 2 for attaching photographing lenses on the camera body 1, as shown in FIG. 6. Moreover, a mount 11 which engages the body mount 2 is arranged at one end of the enlargement photographing apparatus 10, while a mount 12 which engages with a photographing lens-barrel 50 is arranged at the other end of the enlargement photographing apparatus 10.

A contact 13 for fetching photographing lens information is arranged within or inside the mount 12, and is adapted to be engaged with a contact (not shown) which is arranged at a position to which the photographing lens-barrel 50 is opposed.

Furthermore, a lens-barrel 15 which is extendedly and in a retractable manner movable in an optical-axis direction indicated by double headed arrow 16 in FIG. 6 is arranged within the enlargement photographing apparatus 10. The lens-barrel 15 is extendible and retractable in interlocking relationship with angular movement of a motor 41 which is arranged within a pedestal 14A which is formed in projection on a central bottom of the enlargement photographing apparatus 10.

A liquid-crystal (LCD) display 80 for displaying a computed photographing scale factor or the like to be described later is arranged on an outer peripheral surface of pedestal 14A of the enlargement photographing apparatus 10. Further, a group of key switches 90 for setting and inputting the photographing scale factor or the like is arranged below the LCD display 80.

Moreover, a mount 51 which engages the mount 12 of the enlargement photographing apparatus 10, and a stop-value setting ring 52 are arranged on the photographing lens-barrel 50.

Figure 7:
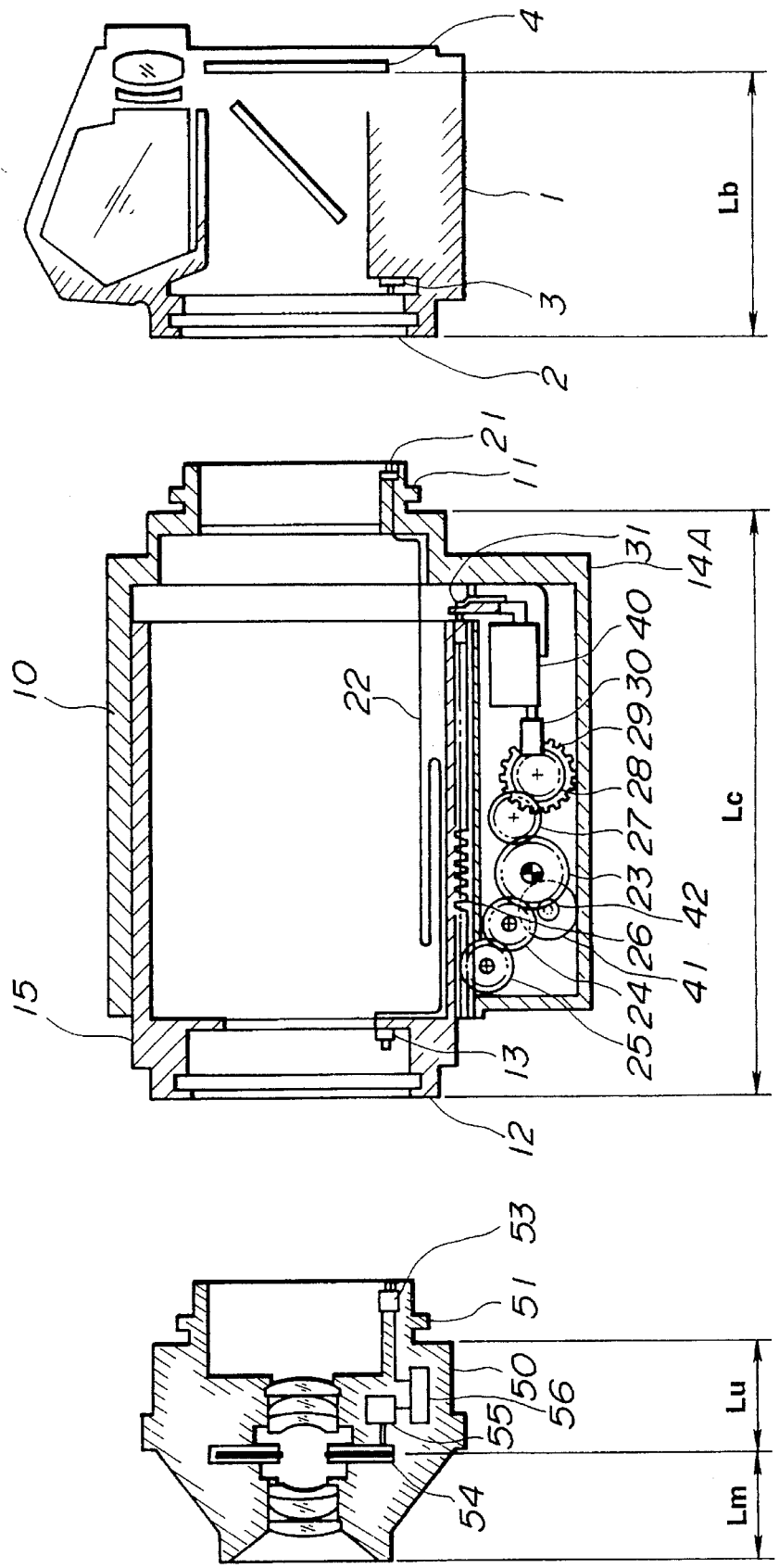
FIG. 7 is a central transverse cross-sectional schematic view showing the enlargement photographing apparatus according to the second embodiment, and the single-lens reflex camera body and the photographing lens-barrel to which the enlargement photographing apparatus is applied.

FIG. 7 is a central transverse cross-sectional schematic view showing the enlargement photographing apparatus according to the embodiment, and the single-lens reflex camera body and the photographing lens-barrel to which the enlargement photographing apparatus is applied.

As shown in FIG. 7, also in the present second embodiment, similar to the first embodiment, the contact 3 on the side of the body is arranged on the body mount 2 in front of the camera body 1. Further, a film 4 is loaded in rear of the interior of the camera body 1.

Furthermore, a contact 21 which is connected to the body contact 3 is arranged within the enlargement photographing apparatus 10. Moreover, the contact 21 is connected to the contact 13 through a flexible substrate 22.

Further, in the second embodiment, a gear 23 and a gear train 24 and 25 which are in mesh with a pinion gear 42 of the motor 41 are arranged on the pedestal 14A at the bottom of the enlargement photographing apparatus 10. The gear 25 is in mesh with a rack 26 which is provided on the lens-barrel 15, whereby the lens-barrel 15 is adapted to perform feeding and renormalizing operations.

Moreover, similar to the first embodiment, the gear 23 is adapted to angularly move a cut-out gear 29 by means of a gear train comprising gears 27 and 28. A photocoupler 30 is mounted on the gear 29, and is adapted to convert the quantity of angular movement of the gear 29 to pulses and to input the same to a computing circuit 40. That is, the quantity of feeding of the lens-barrel 15 is inputted to the computing circuit 40 as the number of pulses.

The flexible substrate 22 is connected to the computing circuit 40. Information of the photographing lens-barrel 50 and information of the camera body 1 are inputted to the computing circuit 40. Further, a switch 31 is an initial-position resetting switch for the lens-barrel 15, and is adapted to be turned on under a state of the shortest reference length to send the resetting signal to the computing circuit 40 as shown in FIG. 7. Moreover, when the lens-barrel 15 is fed, the switch 31 is adapted to be turned off so that the quantity of feeding is measured.

A contact 53 connected to the contact 13 of the enlargement photographing apparatus 10, a pulse motor 55 for driving a stop mechanism 54, and a control circuit 56 are arranged within the photographing lens-barrel 50. The control circuit 56 is adapted to control the pulse motor 55, and has built therein a memory which stores therein various kinds of data of the photographing lenses so that exchange of information is performed between the enlargement photographing apparatus 10 and the camera body 1 through the contact 53.

Furthermore, in FIG. 7, it is assumed that a distance from the film surface of the camera body 1 to the body mount is $L_b$, the shortest length serving as a reference length of the enlargement photographing apparatus 10 is $L_c$, a distance from the lens mount to the lens principal point is $L_u$, and a distance from the lens principal point to the forward end of the lens frame is $L_m$.

Figure 8:
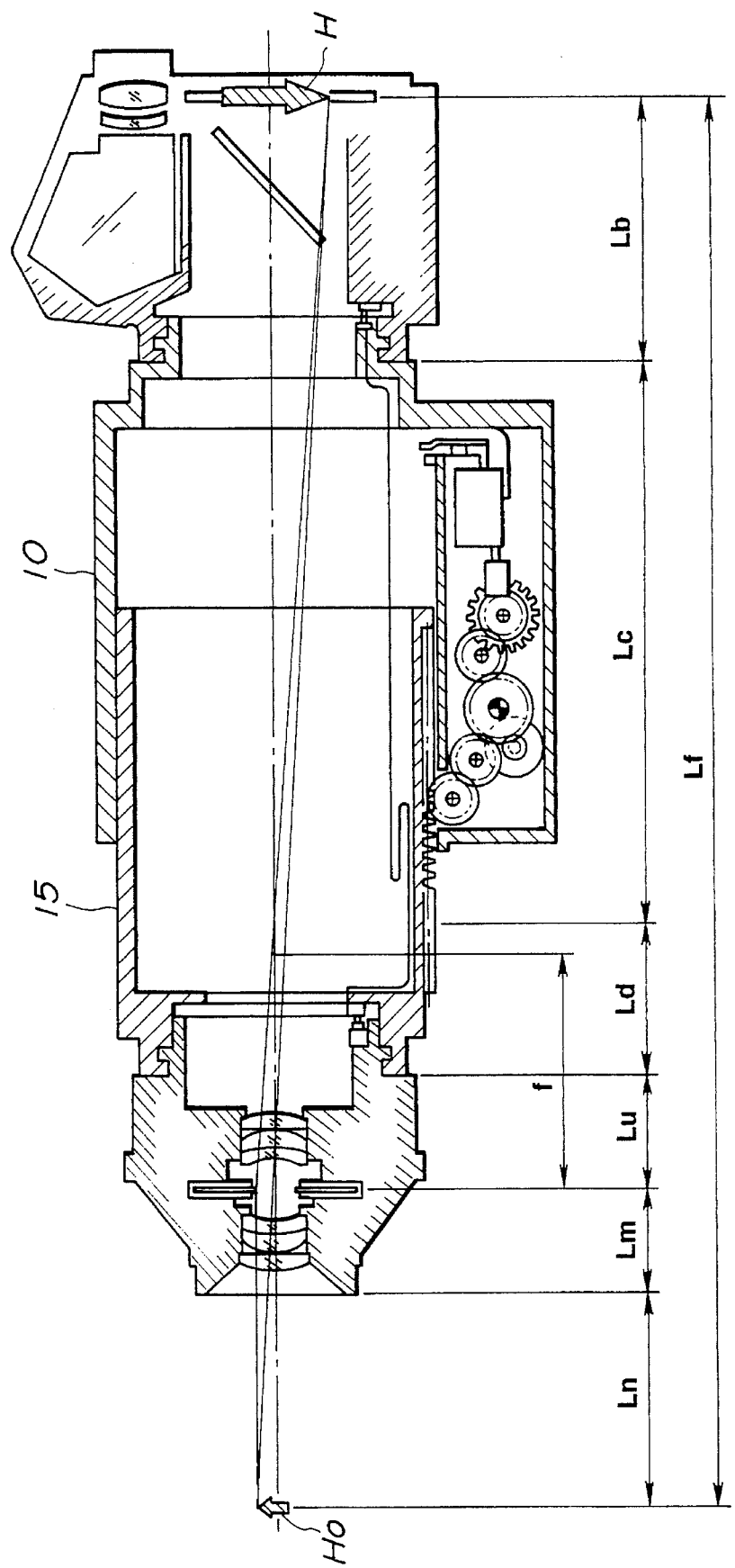
FIG. 8 is a cross-sectional schematic view under a photographing state at the time the enlargement photographing apparatus according to the second embodiment is coupled to the camera body and the photographing lens-barrel.

FIG. 8 is a cross-sectional schematic view under a photographing state when the enlargement photographing apparatus according to the embodiment is coupled to the camera body and the photographing lens-barrel.

Formation is made such that the lens-barrel 15 of the enlargement photographing apparatus 10 is fed through about a length of $L_d$, and an enlarged image of a subject $H_O$ is formed on a film surface as H. When it is assumed that a distance from the subject to the forward end of the lens frame is $L_n$, and a distance from the subject to the film surface is $L_f$, the aforesaid equations (4), (5) and (6) hold from the aforementioned equations (1), (2) and (3) similarly to the first embodiment.

That is, if the focal length $f$ of the photographing lenses, the distance $L_u$ from the lens mount to the lens principal point, the distance $L_m$ from the lens principal point to the forward end of the lens frame, the distance $L_b$ from the film surface within the camera body to the body mount and the shortest length $L_c$ of the enlargement photographing apparatus are known, and if the quantity of feeding $L_d$ on the basis of the number of pulses from the photocoupler can be measured, β, $L_f$ and $L_n$ can be computed.

Figure 9:
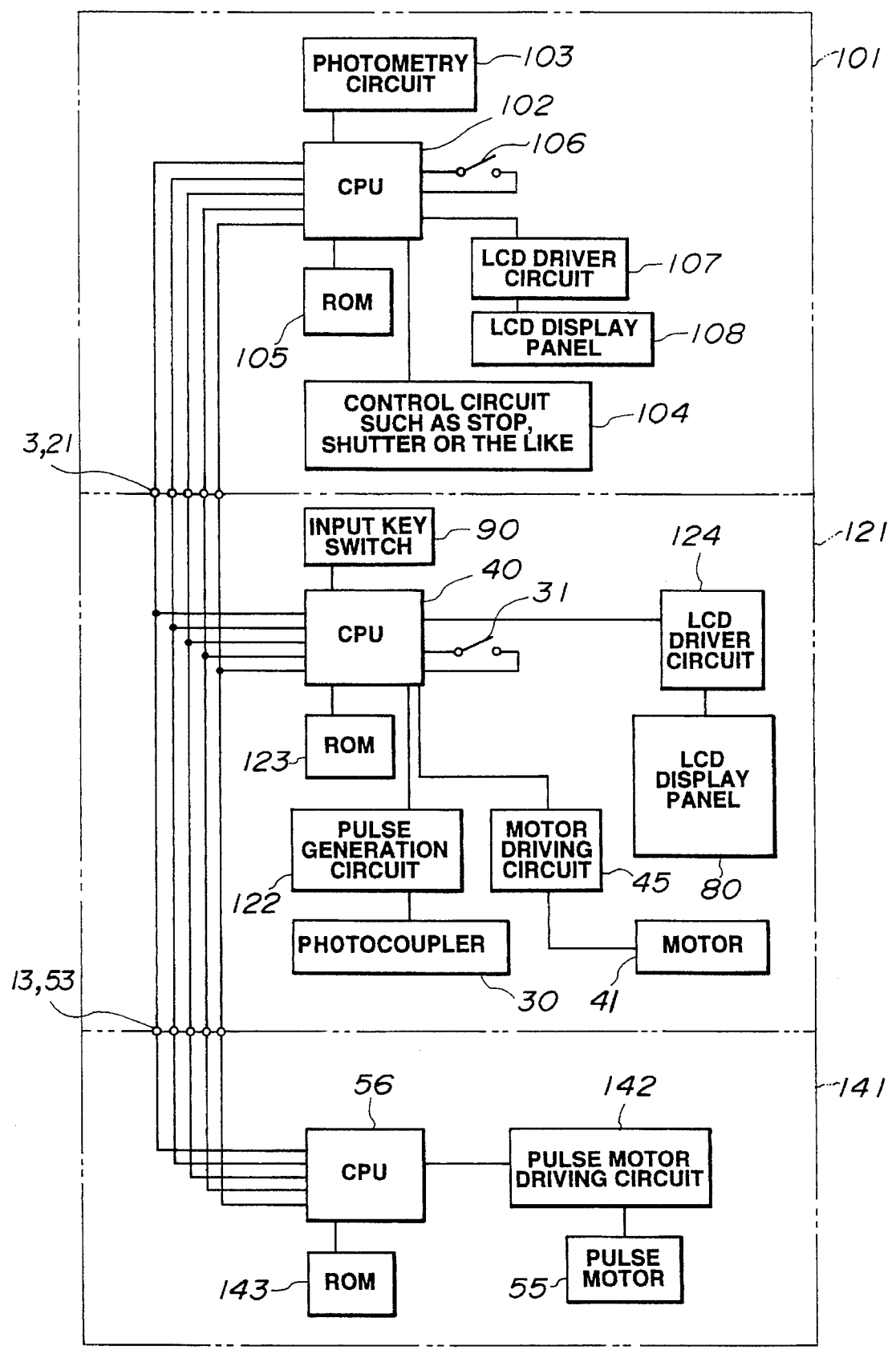
FIG. 9 is an electric circuit view showing an electric circuit in the enlargement photographing apparatus according to the second embodiment and the camera body and the photographing lens-barrel.

FIG. 9 is an electric circuit view showing the enlargement photographing apparatus according to the second embodiment, including an electric circuit the camera body and an electric circuit in the photographing lens-barrel.

The embodiment is different from the first embodiment in that an input key switch group 90 for setting and inputting the photographing scale factor or the like, the motor 41 and a motor driving circuit 45 are connected to a computing circuit 40, an LCD display 80 is connected to the computing circuit 40 through an LCD driver circuit 124, and the photographing scale factor computed by the computing circuit 40 or the like can be displayed. The other arranging elements are similar to those of the first embodiment and will be omitted from description here.

Figure 10A:
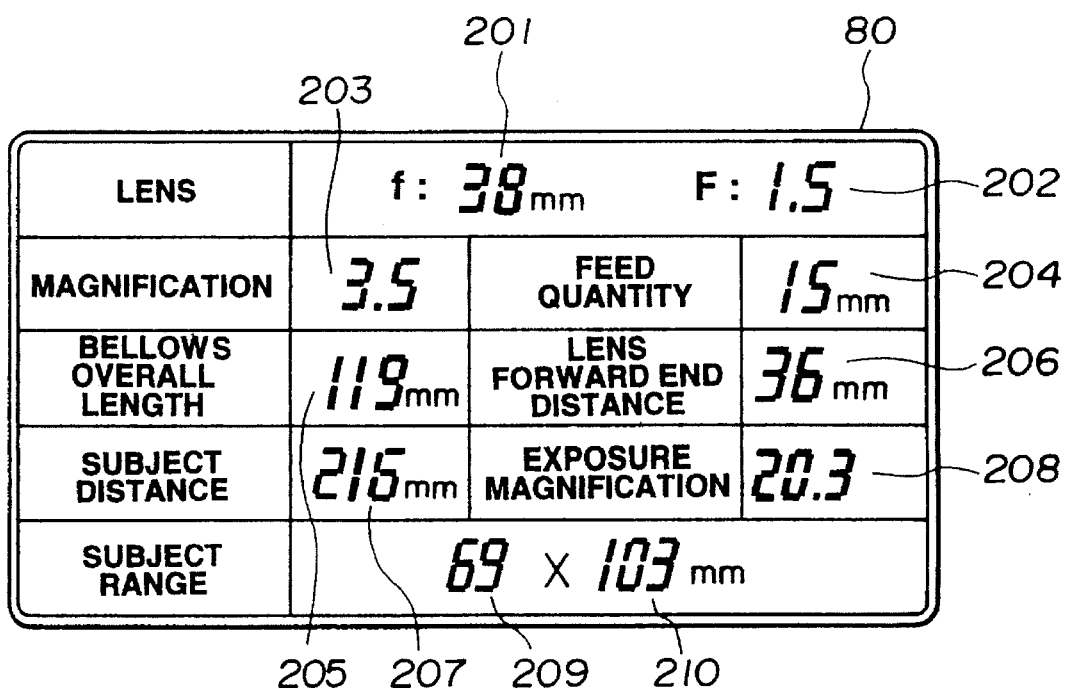
FIG. 10a is a first display example of an LCD display and FIG. 10b is a group of input key switches in the enlargement photographing apparatus according to the second embodiment.
Figure 10B:
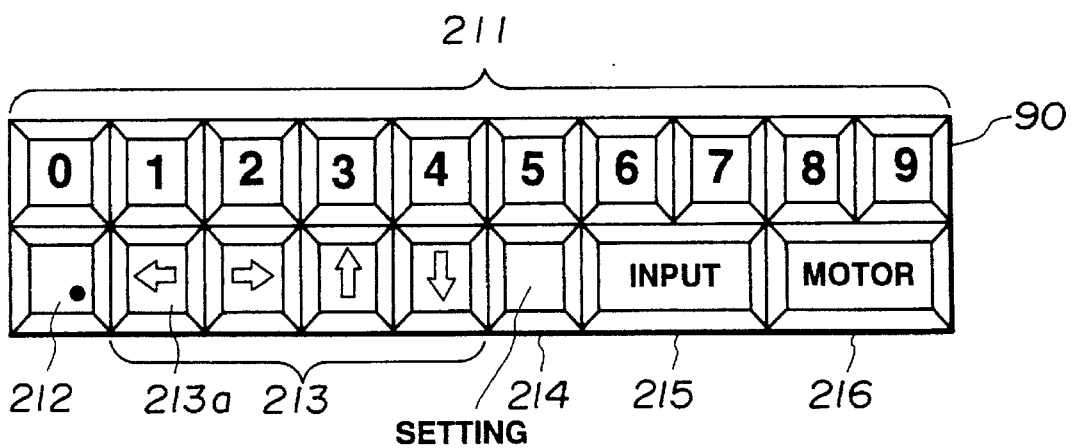
Figure 11A:
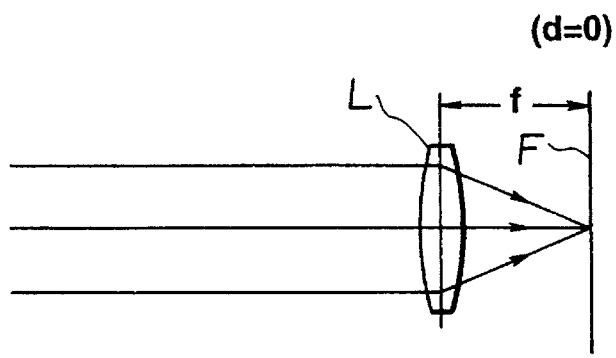
FIG. 11A shows the relationship between a feeding quantity $\underline{d}$ and a photographing scale factor $\beta$ of conventional photographing lenses, and is a view showing a case where the quantity of feeding $\underline{d}$ of the photographing lenses $\underline{L}$ is zero, and the photographing scale factor $\beta = 1\infty$.
Figure 11B:
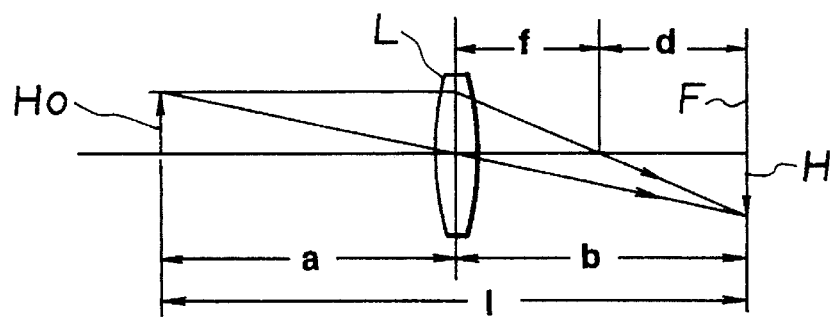
FIG. 11B shows the relationship between the feeding quantity $\underline{d}$ and the photographing scale factor $\beta$ of the conventional photographing lenses, and is a view showing the time at which the photographing scale factor $\beta$ is approximately 1 time under a state where the photographing lenses $\underline{L}$ are fed.
Figure 11C:
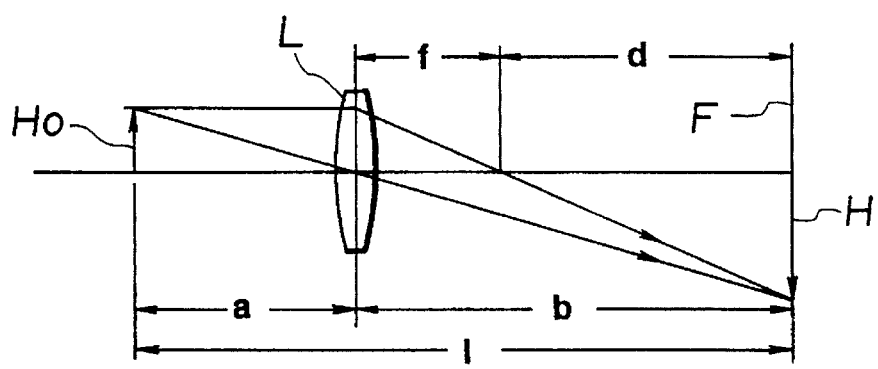
FIG. 11C shows the relationship between the feeding quantity $\underline{d}$ and the photographing scale factor $\beta$ of the conventional photographing lenses, and is a view showing the time at which the photographing scale factor $\beta$ is approximately 2 times under a state where the photographing lenses $\underline{L}$ are fed.

FIG. 10a is a first display example of the LCD display 80 and FIG. 10b shows the input key switch group 90 in the enlargement photographing apparatus according to the embodiment.

Display is provided by a plurality of 7-segment numerical characters. In FIG. 10a, the reference numeral 201 denotes a focal length of the photographing lenses being used; 202, an open F-number of the photographing lenses; 203, a photographing scale factor β which is computed on the basis of the equation (4); 204, the quantity of feeding of the lens-barrel 15; 205, the overall length of an intermediate photographing device, which is a value of $L_c+L_d$; 206, a distance $L_n$ between the subject and the forward end of the photographing lens frame; and 207, a distance $L_f$ from the subject to the film surface. Further, the exposure scale factor 209, the longitudinal and lateral dimensions or sizes of the photographable subject range, a lateral dimension 210 and the like can be displayed.

The input key switch group 90 includes numerical-value keys 211 from 0 to 9, a decimal point key 212, setting-item designating keys 213, a changing-setting start key 214, a changing-numerical-value input key 215, and a motor start key 216 for starting movement of the lens-barrel 15 by computing result values.

Operation of the second embodiment arranged as described above will be described.

First, as shown in FIG. 8, the camera body 1, the enlargement photographing apparatus 10 and the photographing lens-barrel 50 are coupled to each other. Then, a magnification scale factor to be photographed is decided. Here, setting of the decided photographing scale factor will be described with reference to FIG. 10.

First, when the setting key 214 is depressed, the numeral values of the items capable of being set, of the LCD display 80 are turned on and off. If the previous final setting item is setting of the quantity of feeding, the numerical value 204 of the quantity of feeding is turned on and off. Since this time is setting of the photographing scale factor, a key 213a of the setting-item designating keys 213 is depressed to turn on and off the numerical value of the scale factor to display the same. The item set in this manner is selected by the keys 213. Changing is made to a scale factor desired to be photographed by the numerical-value input keys 211 and the decimal-point key 212 at the time the numerical value of the scale factor is turned on and off. After changing, when the input key 215 is depressed, computation starts. As shown in FIG. 10, the computation result is visually displayed on the LCD display 80.

If the display result is O.K., when the motor key 216 is next depressed, the lens-barrel 15 starts its movement in accordance with the computation result. When the movement is performed, the displacement lens-barrel 15 is measured by the number of pulses from the cut-out gear 29, and stops at the time the measurement becomes the quantity of feeding of the computation result.

Setting can automatically be made to the desired photographing scale factor by the above-described operation.

In this manner, the second embodiment is arranged such that, after the changing numerical values have been inputted, at first only computation is performed, and the lens-barrel 15 is moved after the computation result has been confirmed by the LCD display. Accordingly, if the state reaches a state which exceeds the photographing scale factor deviated from the photographing region range of the photographing lenses being used and the quantity of feeding ability of the lens-barrel 15 is reached, warning is displayed so that it is possible to prevent the lens-barrel 15 from being wastefully moved to waste electricity.

Further, the setting input is not limited only to the scale factor and the quantity of feeding, but may be the distance of the lens forward end and the distance of the subject. Thus, It is possible to compute the other numerical values from the equations (4), (5) and (6), and it is possible to always display all items on the LCD display 80 as shown in FIG. 10.

In connection with the above, the displays 201 and 202 display information of the lenses being used. However, if data of the other changeable close-up photography lens group are stored in the ROM 123 which is arranged on the enlargement photographing apparatus 10, it is also possible to retrieve and collate information of the stored lens group to support adequate lenses at the time the present lenses are inadequate for the desired photographing scale factor. Display in this case is easy to be understood if a method is taken in which the display 201 is brought to the focal-distance numerical value of the supporting lenses to perform turning-on and -off and display thereof.

In connection with the above, in the second embodiment, the distance $L_b$ from the film surface to the body mount of the camera body is held or retained in the ROM 105 within the camera, while the photographing lens information is held in the ROM 143 within the lenses. However, it is possible to store all of this information in the ROM 123 within the enlargement photographing apparatus, and to realize the same into the identification information of the photographing lenses and the camera body by a method of fetching into the enlargement photographing apparatus.

According to such second embodiment, it is possible to display the focal length of the used lenses, the open F-number of the used lenses, the photographing scale factor, the quantity of feeding, the overall length of the photographing apparatus, the distance between the subject and the forward end of the lens frame, the distance from the subject to the film surface, the exposure scale factor, and the longitudinal and lateral sizes of the photographable subject range on the display of the enlargement photographing apparatus, and to automatically set these factors to a set state by means of the motor. Further, it is possible to generate warning upon a state deviated from the photographing range, to perform supporting of the adequate photographing lenses or the like, and to dissolve difficulty of operation in the enlargement photographing.

As described above, according to the embodiments, it is possible to provide the enlargement photographing apparatus which can easily obtain or produce the optional photographing scale factor.

In this invention, it is apparent that working modes which differ over a wide range can be formed on the basis of this invention without departing from the spirit and scope of the invention. This invention is not restricted by any specific embodiment except as may be limited by the appended claims.

What is claimed is:

1. An enlargement photographing apparatus arranged between photographing lens means and a camera body, comprising:

distance changing means being extendable and retractable in an optical-axis direction for changing a distance between said photographing lens means and said camera body;

feeding-quantity detecting means for detecting a quantity of feeding with respect to a reference position of said distance changing means;

computing means for computing a photographing scale factor based on output information of said feeding-quantity detecting means, information regarding said photographing lenses and said camera body and information of a reference length of said distance changing means which is arranged on said enlargement photographing apparatus; and display means for displaying said photographing scale factor responsive to an output from said computing means.

2. An enlargement photographing apparatus according to claim 1, wherein said display means includes means for displaying at least one type of information of a group of information which is used in said computing means, in addition to said photographing scale factor.

3. An enlargement photographing apparatus according to claim 1, wherein said distance changing means includes:

a fixed lens-barrel releaseably coupled to said camera body;

distance setting means provided on said fixed lens-barrel for setting a desired distance;

a moving lens-barrel movable in the optical-axis direction with respect to said fixed lens-barrel and having another end thereof to which said photographing lens means is releaseably coupled;

driving means for driving said moving lens-barrel to a predetermined position on the basis of an output from said distance setting means;

a flexible printed substrate having an end thereof which is connected to contacts respectively provided at ends of said moving lens-barrel and said fixed lens-barrel, and so arranged as to be extendible and retractable in the optical-axis direction in interlocking relationship with movement of said moving lens-barrel; and contacts in said camera body and contacts in said lens means respectively releaseably connected to contacts at the ends of said moving and fixed lens barrels.

4. An enlargement photographing apparatus according to claim 1, wherein said distance changing means includes:

a fixed lens-barrel having Contacts for electrical connection to contacts on said camera body;

distance setting means provided on said fixed lens-barrel for setting a desired distance;

a moving lens-barrel movable in the optical-axis direction with respect to said fixed lens-barrel and having contacts at an end thereof to which contacts of said photographing lens means are electrically connectable;

driving means for driving said moving lens-barrel to a predetermined position based on an output from said distance setting means; and a flexible printed substrate having ends thereof respectively connected to said moving lens-barrel contacts and said fixed lens-barrel contacts, and so arranged as to be extendible and retractable in the optical-axis direction in interlocking relationship with movement of said moving lens-barrel;

wherein said feeding-quantity detecting means includes pulse generating means for detecting a feeding quantity of said moving lens-barrel with respect to said fixed lens barrel, due to rotation of a motor within said driving means, and generating pulse signals; and photocoupler means for detecting pulse signals from said pulse generating means.

5. An enlargement photographing system for changing a distance between a camera body and a photographing lens-barrel to perform enlargement photographing, comprising:

first memory means provided within said camera body for storing therein information relating at least to said camera body;

a fixed enlargement barrel electrically connected to said camera body;

distance setting means provided on said fixed enlargement barrel for setting a desired distance;

a moving enlargement barrel movable in an optical-axis direction with respect to said fixed enlargement barrel and having contacts at an end thereof to which contacts on said photographing lens barrel are electrically connected;

second memory means provided within said photographing lens-barrel for storing therein information relating at least to said photographing lens-barrel;

driving means for driving said moving enlargement barrel to a predetermined position based on an output from said distance setting means;

feeding-quantity detecting means for detecting a quantity of feeding of said moving enlargement barrel, with respect to a predetermined reference position of said fixed enlargement barrel;

third memory means provided on one of said fixed enlargement barrel and said moving enlargement barrel for storing therein minimum-reference-length information relating at least to said fixed enlargement barrel and said moving enlargement barrel;

computing means for computing a photographing scale factor based on output information of said feeding-quantity detecting means and photographing information from said first, second and third memory means; and display means for displaying said photographing scale factor based on an output from said computing means.

6. An enlargement photographing apparatus according to claim 5, including a flexible printed substrate having ends thereof which are respectively connected to contacts at ends of said moving enlargement barrel and said fixed enlargement barrel, said substrate being extendable and retractable in the optical-axis direction in interlocking relationship with movement of said moving enlargement barrel.

7. An enlargement photographing system for changing a distance between a camera body and a photographing lens-barrel to perform enlargement photography, comprising:

first memory means for storing therein information relating at least to said camera body and said photographing lens-barrel;

a fixed enlargement barrel having contacts electrically connected to contacts on said camera body;

distance setting means provided on said fixed lens-barrel for setting a desired distance;

a moving enlargement barrel movable in an optical-axis direction with respect to said fixed enlargement barrel and having contacts on an end thereof to which contacts on said photographing lens-barrel are electrically connected;

driving means for driving said moving enlargement barrel to a predetermined position based on an output from said distance setting means;

feeding-quantity detecting means for detecting a quantity of feeding of said moving enlargement barrel, with respect to a predetermined reference position of said fixed enlargement barrel;

second memory means provided on one of said fixed enlargement barrel and said moving enlargement barrel for storing therein minimum-reference-length information related at least to said fixed enlargement barrel and said moving enlargement barrel;

computing means for computing a photographing scale factor based on output information of said feeding-quantity detecting means and information from said first and second memory means; and display means for displaying said photographing scale factor computed at least by said computing means.

8. A camera system for performing enlargement photographing, comprising:

a photographing lens;

a camera body;

an intermediate barrel assembly mounted between said photographing lens and said camera body, and having a length thereof which is changeable in an optical-axis direction;

means for outputting a photographing scale factor of a photographing optical system in accordance with length information relating to said intermediate barrel assembly, information of said photographing lens and information of said camera body; and means for electrically displaying said photographing scale factor.

9. A camera system for performing enlargement photographing, comprising:

a photographing lens;

a camera body;

an intermediate barrel assembly mounted between said photographing lens and said camera body, and having a length thereof which is changeable in an optical-axis direction;

means for outputting a photographing scale factor of a photographing optical system in accordance with length information relating to said intermediate barrel assembly, information of said photographing lens and information of said camera body;

means for electrically displaying said photographing scale factor; and said means for displaying said photographing scale factor being arranged on said intermediate barrel assembly.

10. A camera system for performing enlargement photographing, comprising:

a photographing lens;

a camera body;

an intermediate barrel assembly mounted between said photographing lens means and said camera body, and having a length thereof which is changeable in an optical-axis direction;

means for outputting a photographing scale factor of a photographing optical system in accordance with length information relating to said intermediate barrel assembly, information of said photographing lens and information of said camera body;

means for electrically displaying said photographing scale factor; and said means for outputting said photographing scale factor using length information of said intermediate barrel, information of said photographing lens and information of said camera body, to table-refer to said photographing scale factor employing a table look-up means.

11. A camera system for performing enlargement photographing, comprising:

a photographing lens;

a camera body;

an intermediate barrel assembly mounted between said photographing lens and said camera body, and having a length thereof which is changeable in an optical-axis direction;

means for outputting a photographing scale factor of a photographing optical system in accordance with length information relating to said intermediate barrel assembly, information of said photographing lens and information of said camera body;

means for electrically displaying said photographing scale factor; and said display means displaying at least one of a length of said intermediate barrel, information relating to said photographing lens, information relating to said camera body and information relating to a subject in addition to said photographing scale factor.

12. A camera system for performing enlargement photographing, comprising:

a photographing lens;

a camera body;

an intermediate barrel assembly mounted between said photographing lens means and said camera body, and having a length thereof which is changeable in an optical-axis direction;

means for outputting a photographing scale factor of a photographing optical system in accordance with length information relating to said intermediate barrel assembly, information of said photographing lens and information of said camera body;

means for electrically displaying said photographing scale factor; and said photographing lens including memory means for storing therein information relating to said photographing lens and wherein said camera body includes memory means for storing therein information relating to said camera body.

13. A camera system for performing enlargement photographing, comprising:

a photographing lens;

a camera body;

an intermediate barrel assembly mounted between said photographing lens and said camera body, and having a length thereof which is changeable in an optical-axis direction;

means for outputting a photographing scale factor of a photographing optical system in accordance with length information relating to said intermediate barrel assembly, information of said photographing lens and information of said camera body;

means for electrically displaying said photographing scale factor; and information relating to said photographing lenses being a focal length of said photographing lens, a distance from a lens mount of said photographing lens to a lens principal point, and a distance from the lens principal point to a forward end of a lens frame, and wherein information relating to said camera body is a distance from a film surface to a body mount.

14. An intermediate barrel assembly mounted between a photographing optical system and a camera body in order to perform enlargement photographing, comprising:

a barrel assembly having a length which is adjustable in an optical-axis direction;

a motor;

driving means for driving said barrel assembly by a driving force of said motor;

setting means for manually setting a photographing scale factor; and control means for controlling said driving means such that a photographing scale factor of the photographing optical system is coincident with said set photographing scale factor.

15. An intermediate barrel assembly according to claim 14, including means for initiating control of said driving means with respect to said control means.

16. An intermediate lens-barrel according to claim 14, including display means for displaying said set photographing scale factor.

17. An enlargement photographing apparatus having distance changing means which is extendable and retractable in an optical-axis direction to change a distance between photographing lens means and a camera body, said enlargement photographing apparatus comprising:

setting means capable of setting one of a photographing scale factor and a distance from a forward end of said photographing lens means to a subject to be photographed;

computing means for computing a quantity of feeding of said length changing means based on photographing-lens information and camera-body information relating to said photographing lens means and said camera body connected to said enlargement photographing apparatus, reference-length information relating to said distance changing means which is provided on said enlargement photographing apparatus, and output information of said setting means;

moving-quantity measuring means for measuring a quantity of feeding of said distance changing means; and driving control means for controlling, in driving, a quantity of feeding of said distance changing means based on an output from said computing means and said moving-quantity measuring means.

18. An enlargement photographing apparatus according to claim 17, including confirmation means capable of confirming, by a photographer, at least one of various kinds of infirmation including said feeding-quantity information, photographing-lens information and camera-body information relating to said photographing lenses and said camera body connected to said enlargement photographing apparatus, reference-length information of said distance changing means which is provided on said enlargement photographing apparatus, and output information of said setting means, wherein, after the photographer has confirmed said information, start-up of said driving control means is initiated.

19. An enlargement photographing apparatus according to claim 17, including warning means for warning when various kinds of information including said feeding-quantity information, photographing-lens information and camera-body information, reference-length information of said distance changing means which is provided on said enlargement photographing apparatus, output information of said setting means enters an area other than a photographable range.

20. An enlargement photographing apparatus having distance changing means extendable and retractable in an optical-axis direction for changing a distance between photographing lens means and a camera body, said enlargement photographing apparatus comprising:

photographing-scale-factor setting means capable of setting a photographing scale factor;

information storing means for storing therein a plurality of information relating to the camera body and the photographing lens means connected to said enlargement photographing apparatus and a plurality of reference-length information relating to the distance changing means which is provided on said enlargement photographing apparatus;

computing means for computing a quantity of feeding of said length changing means based on information relating to the camera body and the photographing lens means connected to said enlargement photographing apparatus, reference-length information relating to said distance changing means which is provided on said enlargement photographing apparatus, and output information relating to said photographing scale-factor setting means; and means for indicating a photographing lens means suited for a set photographing scale factor based on an output from said computing means and said information memory means.

21. An intermediate barrel assembly mounted between a photographing optical system and a camera body in order to perform enlargement photographing, comprising:

a barrel assembly having a length which is adjustable in an optical-axis direction;

a motor;

driving means for driving said barrel assembly by a driving force of said motor;

setting means for manually setting a photographing scale factor; and control means responsive to said setting means and information from said photographing optical system and said camera for controlling said driving means such that a photographing scale factor of the photographing optical system is coincident with a setting of a photographing scale factor.

22. A camera system for performing enlargement photographing, comprising:

a photographing assembly;

a camera body;

an intermediate lens-barrel mounted between said photographing lens assembly and said camera body, and having a length thereof which is changed in an optical-axis direction;

calculating means for calculating a photographing scale factor of a photographing optical system based on information of a length of said intermediate lens-barrel, information of said photographing lens assembly, and information of said camera body, said calculating means provided in said intermediate lens-barrel; and display means for electrically displaying said photographing scale factor which was calculated, said display means provided in said intermediate lens barrel.

23. A camera system according to claim 21, wherein said display means displays at least one of a length of said intermediate lens-barrel, information of said photographing lens assembly, information of said camera body, and information of a subject in addition to said photographing scale factor.

24. A camera system according to claim 21, wherein said photographing optical system includes a memory for storing information relating said photographing lens assembly and wherein said camera body includes a memory for storing information relating to said camera body.

25. A camera system according to claim 22, wherein said photographing lens assembly includes a memory for storing information relating said photographing lens assembly and wherein said camera body includes a memory for storing information relating to said camera body.

26. A camera system according to claim 22, wherein information of said photographing lens assembly is a focal length of said photographing lenses, a distance from a lens mount to a lens principal point to a forward end of a lens frame of said photographing lenses, and wherein information of said camera body is a distance from a film surface to a body mount.

27. An enlargement photographing apparatus mounted between a photographing lens assembly and a camera body, comprising:

information input means for inputting information relating to said photographing lens assembly;

extending/retracting state detecting means for detecting an extending/retracting state in an optical-axis direction of said enlargement photographing apparatus;

computing means for computing a photographing scale factor from said information input means and an output of said extending/retracting state detecting means; and display means for displaying a computed photographing scale factor.

28. A camera system for performing enlargement photographing, comprising:

a camera body;

a plurality of photographing lenses each having different optical characteristics and selectively usable with said camera body;

an intermediate lens-barrel mounted between one of said photographing lenses and said camera body, and having a length thereof which is changed in an optical-axis direction;

calculating means for calculating a photographing scale factor of a photographing optical system based on information of a length of said intermediate lens-barrel, information of that one of said photographing lenses mounted on said intermediate lens-barrel, and information of said camera body, said calculating means provided in said intermediate lens-barrel; and display means for electrically displaying said photographing scale factor which was calculated, said display means provided in said intermediate lens barrel.

* * * * *